United States Patent
Diaz

(10) Patent No.: US 6,193,449 B1
(45) Date of Patent: Feb. 27, 2001

(54) BRACKET DRILL TEMPLATE

(76) Inventor: Alberto Diaz, 376 Frankfort St., Orange, NJ (US) 07050

( * ) Notice: Subject to any disclaimer, the term of this patent is extended or adjusted under 35 U.S.C. 154(b) by 0 days.

(21) Appl. No.: 09/422,718

(22) Filed: Oct. 22, 1999

(51) Int. Cl.[7] ............................................. B23B 49/02
(52) U.S. Cl. ................................. 408/115 R; 408/72 R
(58) Field of Search ............................. 408/72 R, 72 B, 408/115 R, 115 B

(56) References Cited

U.S. PATENT DOCUMENTS

| | | | |
|---|---|---|---|
| 2,843,167 | * | 7/1958 | Rushton ........................... 408/115 R |
| 3,212,366 | * | 10/1965 | Russell et al. ................... 408/115 R |
| 3,392,607 | * | 7/1968 | Gieseke ........................... 408/115 R |
| 4,306,823 | * | 12/1981 | Nashlund ......................... 408/115 R |
| 4,331,411 | * | 5/1982 | Kessinger et al. ............... 408/115 R |
| 4,715,125 | * | 12/1987 | Livick .............................. 408/115 R |
| 4,813,826 | * | 3/1989 | Riedel ............................. 408/115 R |
| 5,114,285 | * | 5/1992 | Brydon ............................ 408/115 R |
| 5,222,845 | * | 6/1993 | Goldstein et al. ............... 408/115 R |
| 5,573,352 | * | 11/1996 | Matadobra ...................... 408/115 R |

* cited by examiner

*Primary Examiner*—Steven C. Bishop
(74) *Attorney, Agent, or Firm*—Paul R. Gauer

(57) ABSTRACT

A 3 sided bracket shaped template for accurately drilling door knob and lock holes in doors comprising a template plate a at right angle to a lock plate again at a right angle to a reverse plate. The template plate and reverse plate each contain rectangular apertures for drill passage, and the template plate further has zee bracket sleeves on the bottom and both sides of the rectangular aperture for slidably mounting removable plate guides each with different perpendicular cylindrical extension guide for drills of varying sizes. The lock plate also has a centered circular hole with a tubular drill guide perpendicular to the lock plate.

2 Claims, 4 Drawing Sheets

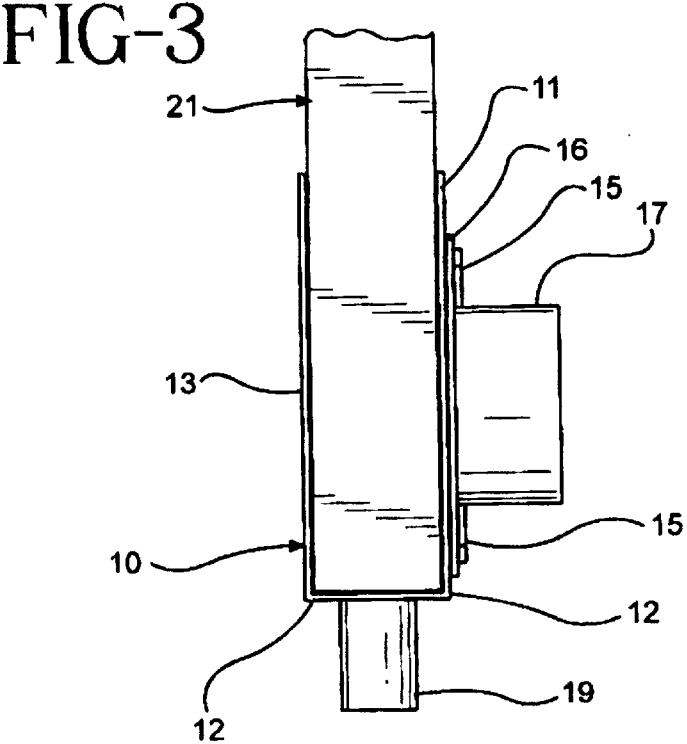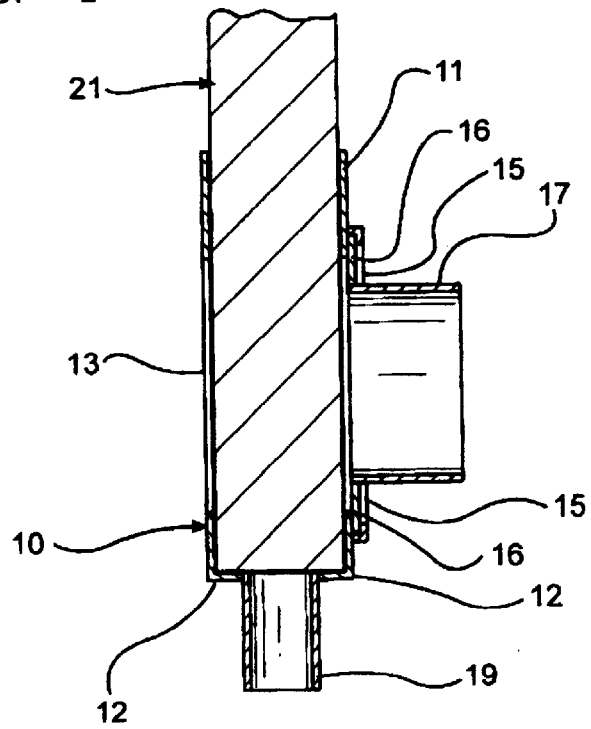

BRACKET DRILL TEMPLATE

This invention relates generally to drill templates and more particularly to templates for drilling holes for installation of door knobs and locks.

BACKGROUND ART

It is known among builders and carpenters that the hardest part of installing a door is drilling the holes for the door knob and lock.

Some door knob and lock assemblies come with paper or cardboard templates for drilling the holes in the proper places but they tear easily. As a result a few inventors have patented complex devices to solve this problem.

U.S. Pat. No. 5,222,845 to Goldstein & Collier filed Jun. 22, 1992 describes a drill guide apparatus held in place by a clamping screw and plate and having a plurality of apertures and drill bushings.

U.S. Pat. No. 4,715,125 to Livick filed Dec. 8, 1986 comprises a pair of spaced, parallel, rectangular, frame members for clamping to a door which members have a series of pin holes for adjusting the location of tubular hole cutting guides.

OBJECTS OF THE INVENTION

One object of the invention is to provide a drill template which perfectly aligns the holes for door knob and lock every time it is used.

Another object is to provide a sturdy drill template for holes for the door knob and lock, which can be reused repeatedly without losing its accuracy.

A further object is to simplify the tasks of aligning and drilling door knob and lock holes.

A still further object is to create a door hardware drill template with a minimum number of parts.

Yet another object is to develop a door hardware drill template which is inexpensive to manufacture.

SUMMARY OF INVENTION

This invention is in the form of a 3 sided bracket consisting of a template plate at a right angle to a lock plate again at a right angle to a reverse plate. The template and reverse plates each have an aperture sufficiently large enough for any size drill bit to pass through both.

The template plate has zee bracket sleeves surrounding the hole for slidably mounting removable plate guides.

Each plate guide has a perpendicularly annexed tubular drill guide of different size. The bracket's lock plate contains a circular hole for cutting the bed of the protruding locking device and for insertion of another tubular drill guide. This invention differs from the prior art in many respects, most particularly its one-piece 3 sided construction and slidably removable drill bit guide plates.

BEST MODE OF PRACTICE

Figure 1:
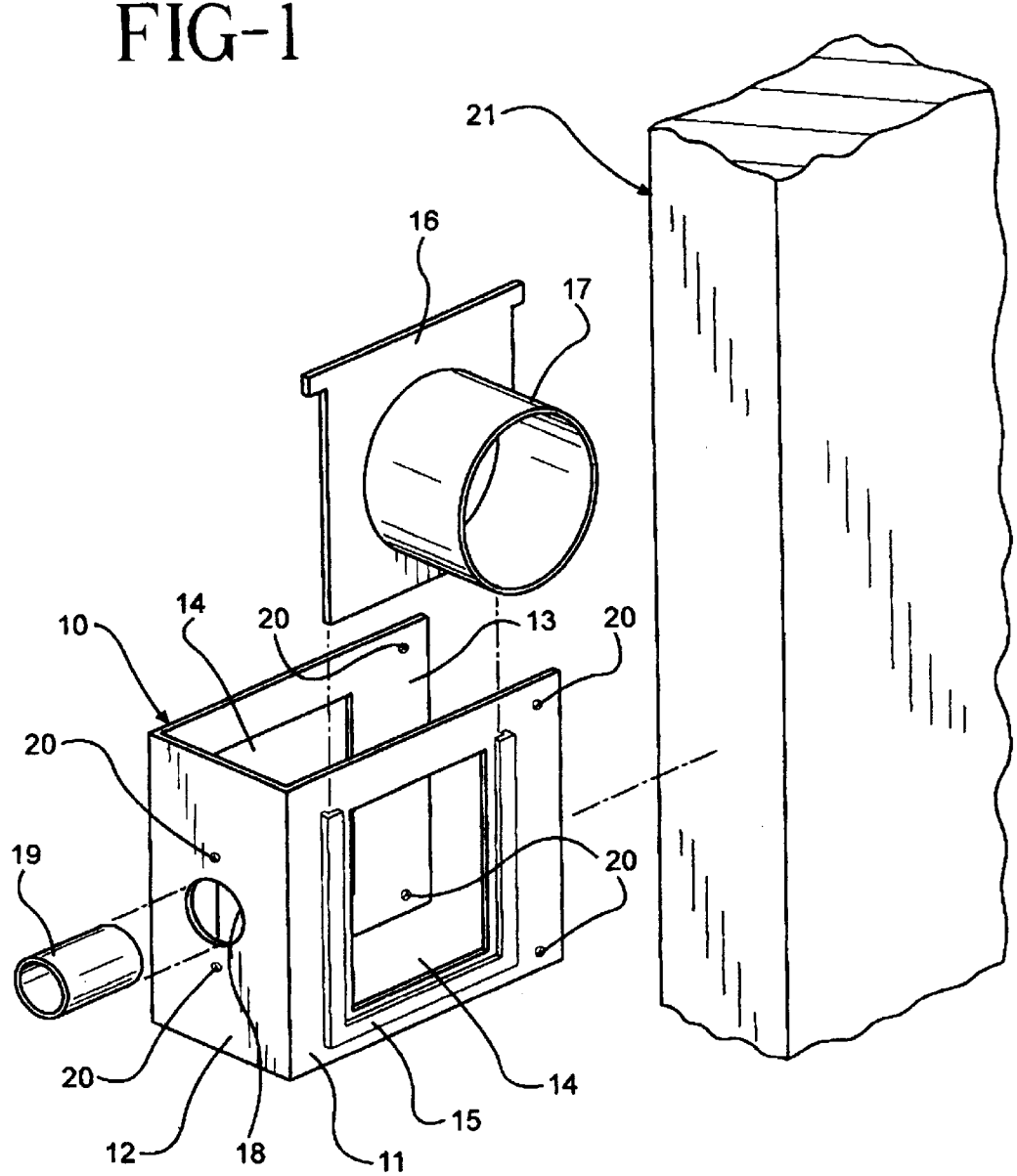
FIG. 1 Perspective view
FIG. 2 Working view
FIG. 3 Top view
FIG. 4 Bottom view
FIG. 5 Front view
FIG. 6 Side view

FIG. 1. A door hardware bracket drill template 10 is shown with a template plate 11 at a right angle to a lock plate 12 again at a right angle to a reverse plate 13 so as to form a bracket. The template plate 11 has a rectangular aperture 14 in it as does the reverse plate 13. These rectangular apertures 14 are aligned with each other and are sufficiently large for any size drill bit to pass through both. The template plate 11 has zee bracket sleeves 15 surrounding the aperture 14 for slidably mounting removable plate guides 16. Each plate guide 16 has a tubular drill guide 17 of a different size. The lock plate 12 contains a circular hole 18 for insertion of smaller tubular drill guide 19. A number of pin holes 20 are shown for inserting fasteners to attach the device to door 21.

Figure 2:
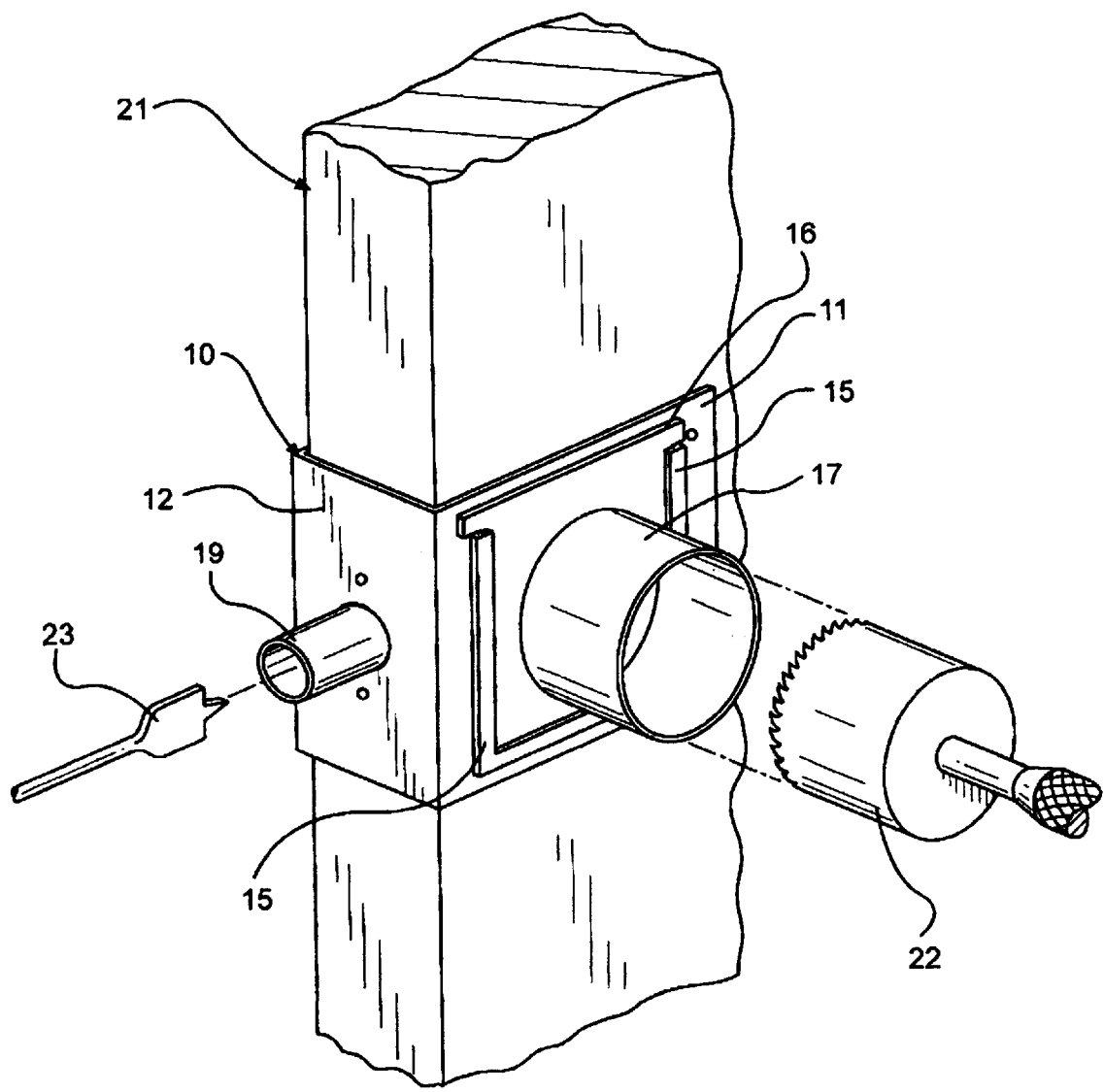

FIG. 2. shows an example of operation of the device in which the bracket 10 envelopes a door 21. Visible is the template plate 11 in which a plate guide 16 has been slidably mounted into zee bracket sleeves 15. Plate guide 16 has a tubular drill guide 17 into which cupdrill bit 22 is being inserted for purpose of cutting a hole in door 21 for a door knob. Also visible is lock plate 12 with smaller tubular drill guide 19 into which wood drill bit 23 is being inserted for purpose of cutting a hole in door 21 for the bed of a protruding lock.

FIG. 3. top view, depicts bracket 10 surrounding door 21. Protruding on the right is tubular drill guide 17 on plate guide 16 suspended in zee bracket sleeves 15 attached to template plate 11. At the base of the drawing is protruding tubular drill guide 19 suspended from lock plate 12. Completing the envelope of door 21 from the left is reverse plate 13.

FIG. 4. bottom view, describes bracket 10 enveloping door 21, with tubular drill guide 17 on plate guide 16 in zee bracket sleeves 15 attached to template plate 11. At the base of the drawing is tubular drill guide 19 annexed to lock plate 12. On the left side of drawing is reverse plate 13.

Figure 5:
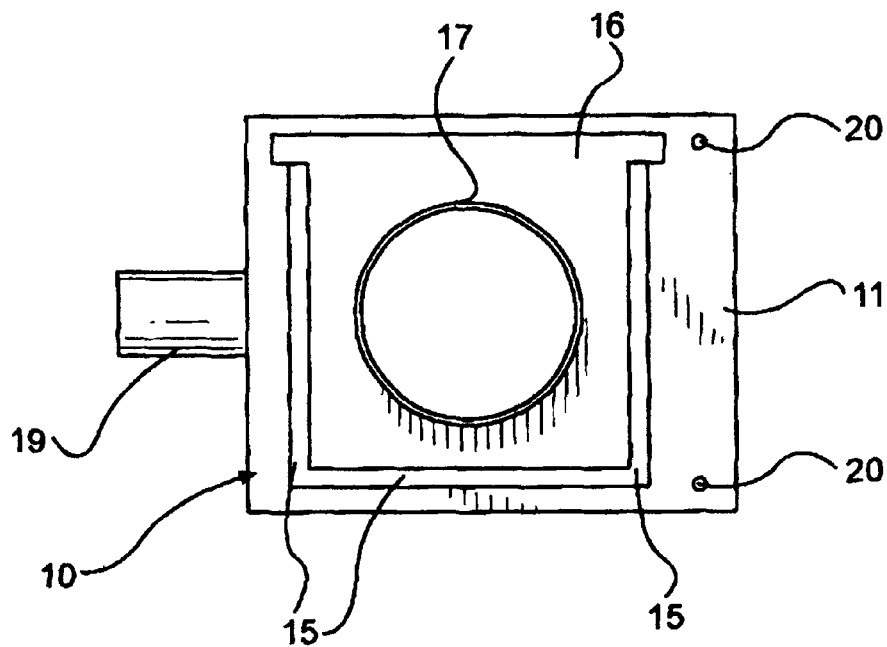

FIG. 5. shows the bracket 10 from the template plate 11 with zee bracket sleeves 15 holding plate guide 16 which in turn supports tubular drill guide 17. Also, shown on the left side of the drawing is tubular drill guide 19. Template plate 11 has pin holes 20.

Figure 6:
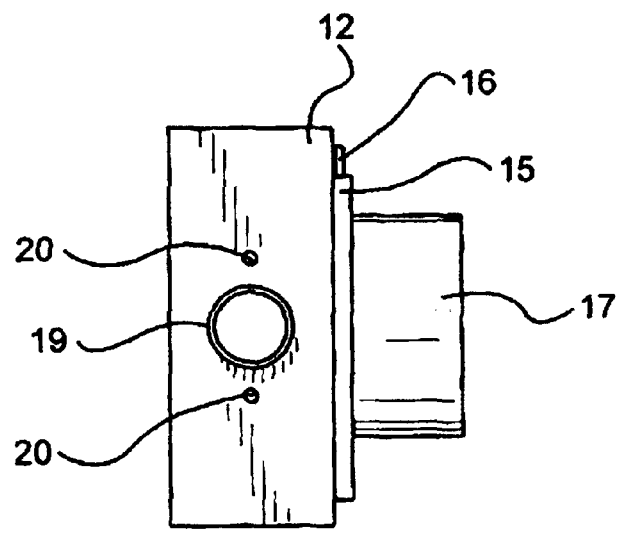

FIG. 6. is a view from the side showing lock plate 12 with pin holes 20 and tubular drill guide 19. Also visible are zee bracket sleeves 15 holding plate guide 16 with tubular drill guide 17.

Inventor claims:

1. A 3 sided bracket shaped template for drilling holes in doors for knobs and locks comprising:
    a template plate at a right angle to a lock plate again at a right angle to a reverse plate;
    said template plate and reverse plate each having matching rectangular apertures;
    said template plate having on 3 sides of aforesaid aperture zee bracket sleeves for slidably mounting gravity fed removable plate guides each containing a different tubular drill guide;
    said lock plate further having a centered circular hole and inserted tubular drill guide.
2. The 3 sided bracket shaped template of claim 1 wherein, said template plate, lock plate and reverse plate each has pin holes for means to attach said bracket shaped template to a door.

* * * * *